(12) United States Patent
Brumfield et al.

(10) Patent No.: US 7,447,655 B2
(45) Date of Patent: Nov. 4, 2008

(54) SYSTEM AND METHOD FOR AUTOMATIC SCALPING OF A TRADEABLE OBJECT IN AN ELECTRONIC TRADING ENVIRONMENT

(75) Inventors: Harris Brumfield, Chicago, IL (US); Joan Ebersole, Glen Ellyn, IL (US); Assaf Pazner, Chicago, IL (US)

(73) Assignee: Trading Technologies International, Inc., Chicago, IL (US)

( * ) Notice: Subject to any disclaimer, the term of this patent is extended or adjusted under 35 U.S.C. 154(b) by 1149 days.

(21) Appl. No.: 10/403,879

(22) Filed: Mar. 31, 2003

(65) Prior Publication Data
US 2005/0262003 A1 Nov. 24, 2005

Related U.S. Application Data

(63) Continuation-in-part of application No. 10/125,894, filed on Apr. 19, 2002, which is a continuation-in-part of application No. 09/971,087, filed on Oct. 5, 2001, now Pat. No. 7,127,424, and a continuation-in-part of application No. 09/590,692, filed on Jun. 9, 2000, now Pat. No. 6,772,132, and a continuation-in-part of application No. 09/589,751, filed on Jun. 9, 2000, now Pat. No. 6,938,011.

(60) Provisional application No. 60/325,553, filed on Oct. 1, 2001, provisional application No. 60/238,001, filed on Oct. 6, 2000, provisional application No. 60/186,322, filed on Mar. 2, 2000.

(51) Int. Cl.
*G06Q 40/00* (2006.01)

(52) U.S. Cl. ........................................................ 705/37

(58) Field of Classification Search ..................... 705/37
See application file for complete search history.

(56) References Cited

U.S. PATENT DOCUMENTS

| 4,674,044 A | 6/1987 | Kalmus |
| 4,750,135 A | 6/1988 | Boilen |

(Continued)

FOREIGN PATENT DOCUMENTS

| EP | 1067471 A1 | 1/2001 |

(Continued)

OTHER PUBLICATIONS

English Translation of TSE "Publication 1".

(Continued)

*Primary Examiner*—James A Kramer
*Assistant Examiner*—Jessica L Lemieux
(74) *Attorney, Agent, or Firm*—McDonnell Boehnen Hulbert & Berghoff LLP

(57) ABSTRACT

A system and methods for automatic scalping in an electronic trading environment are presented. According to one embodiment, a trading application may display an indicator associated with a price level based on which a tradable object can be automatically traded. When a scalping application detects a fill associated with a first order, the scalping application may automatically enter a second order to offset a position created with the first order. According to one embodiment, the second order is automatically placed on the market when the inside market moves to a predetermined price level in relation to the displayed indicator.

25 Claims, 6 Drawing Sheets

U.S. PATENT DOCUMENTS

| | | | |
|---|---|---|---|
| 4,903,201 | A | 2/1990 | Wagner |
| 5,038,284 | A | 8/1991 | Kramer |
| 5,077,665 | A | 12/1991 | Silverman |
| 5,101,353 | A | 3/1992 | Lupien |
| 5,136,501 | A | 8/1992 | Silverman |
| 5,270,922 | A | 12/1993 | Higgins |
| 5,297,031 | A | 3/1994 | Gutterman |
| 5,297,032 | A | 3/1994 | Trojan |
| 5,675,746 | A | 10/1997 | Marshall |
| 5,689,651 | A | 11/1997 | Lozman |
| 5,689,652 | A | 11/1997 | Lupien et al. |
| 5,768,158 | A | 6/1998 | Adler et al. |
| 5,774,877 | A | 6/1998 | Patterson |
| 5,774,878 | A | 6/1998 | Marshall |
| 5,793,301 | A | 8/1998 | Patterson |
| 5,797,002 | A | 8/1998 | Patterson |
| 5,845,266 | A | 12/1998 | Lupien |
| 5,873,071 | A | 2/1999 | Ferstenberg et al. |
| 5,915,245 | A | 6/1999 | Patterson |
| 5,924,082 | A | 7/1999 | Silverman |
| 5,924,083 | A | 7/1999 | Silverman |
| 5,926,801 | A | 7/1999 | Matsubara |
| 5,946,667 | A | 8/1999 | Tull |
| 5,950,177 | A | 9/1999 | Lupien et al. |
| 5,963,923 | A | 10/1999 | Garber |
| 6,012,046 | A | 1/2000 | Lupien |
| 6,014,643 | A * | 1/2000 | Minton ............ 705/36 R |
| 6,035,287 | A | 3/2000 | Stallaert |
| 6,073,115 | A | 6/2000 | Marshall |
| 6,098,051 | A | 8/2000 | Lupien |
| 6,131,087 | A | 10/2000 | Luke |
| 6,134,535 | A | 10/2000 | Belzberg |
| 6,161,098 | A | 12/2000 | Wallman |
| 6,195,647 | B1 | 2/2001 | Martyn |
| 6,272,474 | B1 | 8/2001 | Garcia |
| 6,278,982 | B1 | 8/2001 | Korhammer |
| 6,282,521 | B1 | 8/2001 | Howorka |
| 6,408,282 | B1 * | 6/2002 | Buist ............ 705/36 R |
| 6,516,303 | B1 | 2/2003 | Wallman |
| 6,697,099 | B2 * | 2/2004 | Smith et al. ............ 348/35 |
| 6,766,304 | B2 | 7/2004 | Kemp |
| 6,772,132 | B1 | 8/2004 | Kemp et al. |
| 6,826,553 | B1 | 11/2004 | DaCosta et al. |
| 6,839,686 | B1 | 1/2005 | Galant |
| 6,876,981 | B1 | 4/2005 | Breckmans |
| 6,938,011 | B1 | 8/2005 | Kemp et al. |
| 6,993,504 | B1 | 1/2006 | Friesen |
| 7,127,424 | B2 | 10/2006 | Kemp, II et al. |
| 7,155,410 | B1 * | 12/2006 | Woodmansey et al. ........ 705/37 |
| 7,181,424 | B1 | 2/2007 | Ketchum et al. |
| 7,181,425 | B1 * | 2/2007 | Cha ............ 705/37 |
| 7,209,896 | B1 | 4/2007 | Serkin et al. |
| 7,243,083 | B2 | 7/2007 | Burns et al. |
| 2002/0023038 | A1 | 2/2002 | Fritsch |
| 2002/0035534 | A1 | 3/2002 | Buist |
| 2002/0046146 | A1 | 4/2002 | Otero |
| 2002/0046149 | A1 | 4/2002 | Otero |
| 2002/0046151 | A1 | 4/2002 | Otero |
| 2002/0046156 | A1 | 4/2002 | Horn |
| 2002/0049661 | A1 | 4/2002 | Otero |
| 2002/0055899 | A1 | 5/2002 | Williams |
| 2002/0059129 | A1 | 5/2002 | Kemp |
| 2002/0073017 | A1 | 6/2002 | Robertson |
| 2002/0091611 | A1 | 7/2002 | Minton |
| 2002/0099644 | A1 | 7/2002 | Kemp |
| 2002/0120551 | A1 | 8/2002 | Jones |
| 2002/0138401 | A1 | 9/2002 | Allen |
| 2002/0178096 | A1 | 11/2002 | Marshall |
| 2003/0004852 | A1 | 1/2003 | Burns |
| 2003/0004853 | A1 | 1/2003 | Ram |
| 2003/0009411 | A1 | 1/2003 | Ram |
| 2003/0023536 | A1 | 1/2003 | Hollerman et al. |
| 2003/0023542 | A1 | 1/2003 | Kemp |
| 2003/0065608 | A1 | 4/2003 | Cutler |
| 2003/0069834 | A1 | 4/2003 | Cutler |
| 2003/0097325 | A1 | 5/2003 | Freisen |
| 2003/0126065 | A1 | 7/2003 | Eng |
| 2003/0200167 | A1 | 10/2003 | Kemp et al. |
| 2003/0236737 | A1 | 12/2003 | Kemp et al. |
| 2004/0093300 | A1 | 5/2004 | Burns |
| 2004/0103054 | A1 | 5/2004 | Singer |
| 2004/0117292 | A1 | 6/2004 | Brumfield et al. |
| 2006/0259383 | A1 | 11/2006 | Kemp et al. |
| 2006/0259384 | A1 | 11/2006 | Schluetter et al. |
| 2006/0259404 | A1 | 11/2006 | Brumfield et al. |
| 2006/0259411 | A1 | 11/2006 | Burns |
| 2006/0259412 | A1 | 11/2006 | Kemp et al. |
| 2006/0265303 | A1 | 11/2006 | Kemp et al. |
| 2006/0265304 | A1 | 11/2006 | Brumfield et al. |
| 2006/0265305 | A1 | 11/2006 | Schuletter et al. |
| 2006/0271475 | A1 | 11/2006 | Brumfield et al. |

FOREIGN PATENT DOCUMENTS

| | | |
|---|---|---|
| WO | WO9114231 A1 | 9/1991 |
| WO | WO95/26005 A1 | 9/1995 |
| WO | WO9849639 A1 | 11/1998 |
| WO | WO9919821 A1 | 4/1999 |
| WO | WO 99/30259 | 6/1999 |
| WO | WO99/30259 A1 | 6/1999 |
| WO | WO9953424 A1 | 10/1999 |
| WO | WO00/52619 A1 | 9/2000 |
| WO | WO00/62187 A2 | 10/2000 |
| WO | WO00/62187 A3 | 10/2000 |
| WO | WO00/65510 A1 | 11/2000 |
| WO | WO01/16830 A1 | 3/2001 |
| WO | WO01/16852 A2 | 3/2001 |
| WO | WO01/16852 C1 | 3/2001 |
| WO | WO01/22266 A2 | 3/2001 |
| WO | WO01/22315 A2 | 3/2001 |
| WO | WO0122315 A3 | 3/2001 |
| WO | WO 01/27843 | 4/2001 |
| WO | WO 01/71557 | 9/2001 |
| WO | WO0165403 A2 | 9/2001 |
| WO | WO01/88808 A1 | 11/2001 |
| WO | WO02103601 A1 | 12/2001 |
| WO | WO02/15461 A2 | 2/2002 |
| WO | WO02/33621 A1 | 4/2002 |
| WO | WO02/33623 A1 | 4/2002 |
| WO | WO02/33635 A1 | 4/2002 |
| WO | WO02/33636 A1 | 4/2002 |
| WO | WO02/33637 A1 | 4/2002 |
| WO | WO0229686 A1 | 4/2002 |
| WO | WO02/48945 A1 | 6/2002 |
| WO | WO02/059815 A1 | 8/2002 |
| WO | WO02/069226 A2 | 9/2002 |
| WO | WO02/079940 A2 | 10/2002 |
| WO | WO02/093325 A2 | 11/2002 |
| WO | WO 03/017062 | 2/2003 |
| WO | WO03090032 A2 | 10/2003 |
| WO | WO03090032 A3 | 10/2003 |

OTHER PUBLICATIONS

English Translation of TSE "Publication 2".
English Translation of TSE "Publication 3".
English Translation of TSE Document 1.
REFCO English Translation of TSE "Publication 1".
REFCO English Translation of TSE "Publication 2".
REFCO English Translation of TSE "Publication 3".
APT Brochure, LIFFE Exchange, circa 1990*.
Trading Screen, INTEX of Bermuda, circa 1984*.
Weber, Information Technology in the Major International Financial Markets, Apr. 7, 1993.
Trading Screen, TIFFE Exchange, circa 1989-1990*.

Trading Screen, MEFF, Exchange, circa 1990*.

Cavaletti, Order Routing Article, Futures Magazine, Feb. 1997.

Aurora Article, CBOT, circa 1989*.

One Click Trading Options, Trading Technologies, circa 1998.

Trading Screen, SWX Exchange, circa 1990*.

Expanding futures and options trading around the world, around the clock, GLOBEX, circa 1989*.

Hansell, The computer that ate Chicago, Institutional Investor, Feb. 1989.

Globex Report: An update on the CME Global electronic exchange, Feb. 10, 1989.

NYMEX Access Documents, New York Mercantile Exchange, Feb. 28, 1992.

CATS Traders' Manual, Toronto Stock Exchange, Sep. 30, 1977.

Market Watch, Trading Screen, date not available.

Grummer, Peake, Sellers, Preliminary Feasibility Study, Bermudex Ltd., Nov. 1980.

Peake, Mendellson, The ABCs of trading on a national market system, Appendix C of Preliminary Feasibility Study, Bermudex Ltd., Sep. 1997.

Peake, The last 15 meters, Appendix E of Preliminary Feasibility Study, Bermudex Ltd., Jun. 15, 1997.

Declaration of Brendan Bradley in Case No. 04 C 5312, Nov. 18, 2004.

Memorandum Opinion Published Feb. 9, 2005, of Judge James B. Moran in Case No. 04 C 5312.

USPTO Presentation, NASDAQ, Nov. 8, 2001.

Kharouf, A Trading Room with a View, Futures, 27, 11—Nov. 1998.

www.tradingtechnologies.com/products/xtrade_full.html (viewed May 22, 2001) Jun. 9, 2000.

NASDAQ Workstation II User Guide, Guide to Enhancements for NASDAQ Workstation II Software Release (Apr. 1998) as viewed on the Internet Achieves http://web.archive.org/web/20031208041112/nasdaqtrader.com/trader/tradingservices/productservices/userguides/nwIiguide.pdf.

International Search Report for PCT/US03/12201.

Office Action issued by the USPTO on Jun. 26, 2007 for U.S. Appl. No. 11/417,871.

Pending U.S. Appl. No. 10/403,757, filed Mar. 31, 2003.

Pending U.S. Appl. No. 10/403,881, filed Mar. 31, 2003.

MLT Trade Vizion, http://www.trade-viziion.com/modules.php?name+Products—Jul. 29, 2004.

Office action issued by the USPTO on Mar. 23, 2007 for U.S. Appl. No. 10/125,894.

Pending U.S. Appl. No. 10/125,894, filed Apr. 19, 2002.

* cited by examiner

SYSTEM AND METHOD FOR AUTOMATIC SCALPING OF A TRADEABLE OBJECT IN AN ELECTRONIC TRADING ENVIRONMENT

CROSS REFERENCE TO RELATED APPLICATIONS

This application is a continuation-in-part of U.S. patent application Ser. No. 10/125,894, filed on Apr. 19, 2002, which is a continuation-in-part of U.S. patent application Ser. No. 09/971,087, filed Oct. 5, 2001, which claims the benefit of U.S. Provisional Application No. 60/238,001, filed Oct. 6, 2000. The U.S. patent application Ser. No. 10/125,894 is also a continuation-in-part of U.S. patent application Ser. No. 09/590,692, filed Jun. 9, 2000 and U.S. patent application Ser. No. 09/589,751, filed Jun. 9, 2000, both of which claim the benefit of U.S. Provisional Application No. 60/186,322, filed Mar. 2, 2000. The U.S. patent application Ser. No. 10/125,894 also claims the benefit of U.S. Patent Application No. 60/325,553, filed Oct. 1, 2001. The entire content of each of the above-referenced applications is incorporated herein by reference.

FIELD OF INVENTION

The present invention is directed towards electronic trading. More specifically, the present invention is directed to tools for automatic trading tradeable objects that can be traded with quantities and/or prices.

BACKGROUND

Trading methods have evolved from a manually intensive process to a technology enabled, electronic platform. With the advent of electronic trading, a user or trader can be in virtually direct contact with the market, from practically anywhere in the world, performing near real-time transactions, and without the need to make personal contact with a broker.

Electronic trading is generally based on a host exchange, one or more computer networks, and client devices. In general, the host exchange includes one or more centralized computers to form the electronic heart. Its operations typically include order matching, maintaining order books and positions, price information, and managing and updating a database that records such information. The host exchange is also equipped with an external interface that maintains uninterrupted contact to the client devices and possibly other trading-related systems.

Using client devices, market participants or traders link to the host exchange through one or more networks. A network is a group of two or more computers or devices linked together. There are many types of wired and wireless networks such as local area networks and wide area networks. Networks can also be characterized by topology, protocol, and architecture. For example, some market participants may link to the host through a direct connection such as a T1 or ISDN. Some participants may link to the host exchange through direct connections and through other common network components such as high-speed servers, routers, and gateways. The Internet, a well-known collection of networks and gateways, can be used to establish a connection between the client device and the host exchange. There are many different types of networks and combinations of network types known in the art that can link traders to the host exchange.

Regardless of the way in which a connection is established, software running on the client devices allows market participants to log onto one or more exchanges and participate in at least one market. A client device is a computer such as a personal computer, laptop computer, hand-held computer, and so forth that has network access. In general, client devices run software that creates specialized interactive trading screens. Trading screens enable market participants to obtain market quotes, monitor positions, and submit orders to the host.

Generally, when an order is submitted to a host exchange, the host checks the limits of the order, for example price and quantity, and prioritizes the order with other orders of the same price. When buy and sell order prices cross in the market, a trade occurs, and the information related to the trade is then relayed in some fashion to the client devices. In fact, the host exchange publishes a data feed to the client devices so that the traders can have access to the most current market information.

Market information commonly includes information regarding the inside market and market depth. The inside market is the lowest sell price in the market and the highest buy price in the market at a particular point in time. Market depth refers to quantity available at the inside market and can refer to quantity available at other prices away from the inside market. The quantity available at a given price level is usually provided by the host exchange in aggregate sums. In other words, a host exchange usually provides the total buy or the total sell quantity available in the market at a particular price level in its data feed. The extent of the market depth available to a trader usually depends on the host exchange. For instance, some host exchanges provide market depth for an infinite number of price levels, while some provide only quantities associated with the inside market, and others may provide no market depth at all. Additionally, host exchanges can offer other types of market information such as the last traded price (LTP), the last traded quantity (LTQ), and/or order fill information.

To profit in electronic markets, market participants must be able to assimilate large amounts of data provided by an exchange, and to react more quickly than other competing market participants. Some traders, commonly known as scalpers, trade for small, short-term profits during the course of the trading session. Such traders establish and liquidate their positions quickly, usually within the same hour, or a few minutes, thus making small profits or incurring small losses. However, because market information provided to a trader in an electronic trading environment may change so much faster than in the traditional pit environment, the trader may not be able to respond to the changing market as fast as he/she would wish to. It is therefore desirable to offer tools that can assist a trader in trading a tradable object in an electronic marketplace and help the participant to make desirable trades.

BRIEF DESCRIPTION OF THE DRAWINGS

Example embodiments of the present invention are described herein with reference to the following drawings, in which.

DETAILED DESCRIPTION OF THE PREFERRED EMBODIMENT(S)

I. Automatic Trading Overview

As described with reference to the accompanying Figures, the present invention provides a method and system that preferably operates as an automatic scalping tool by automatically entering an order to offset a position created with another order that has been filled. That is, it preferably operates as a trader's automatic scalping tool that prevents a trader from holding his position open for a long period of time, and allows a trader to make profit upon detecting small market movements.

According to one embodiment, a trader may configure a target price based on which the automatic scalping tool may enter orders to an exchange. For example, if the automatic scalping tool detects the market trend in an upward direction and further that the inside market reaches or crosses the user pre-configured target price, the automatic trading tool may automatically place a sell order to open a position for the trader. In such an embodiment, a price at which the automatic scalping tool places the sell order may be determined based on any user defined formula. For example, the sell order may be placed at the inside market price level or a specific number of ticks away from the inside market. When the sell order is filled, and upon detecting that the market moves in a downward direction and that the inside market reaches or crosses the target price, the automatic scalping tool may automatically place a buy order to offset or close the position created with the sell order. Advantages, including those described directly above, will become readily apparent to one skilled in the art upon reading the description herein.

II. Hardware and Software Overview

Figure 1:
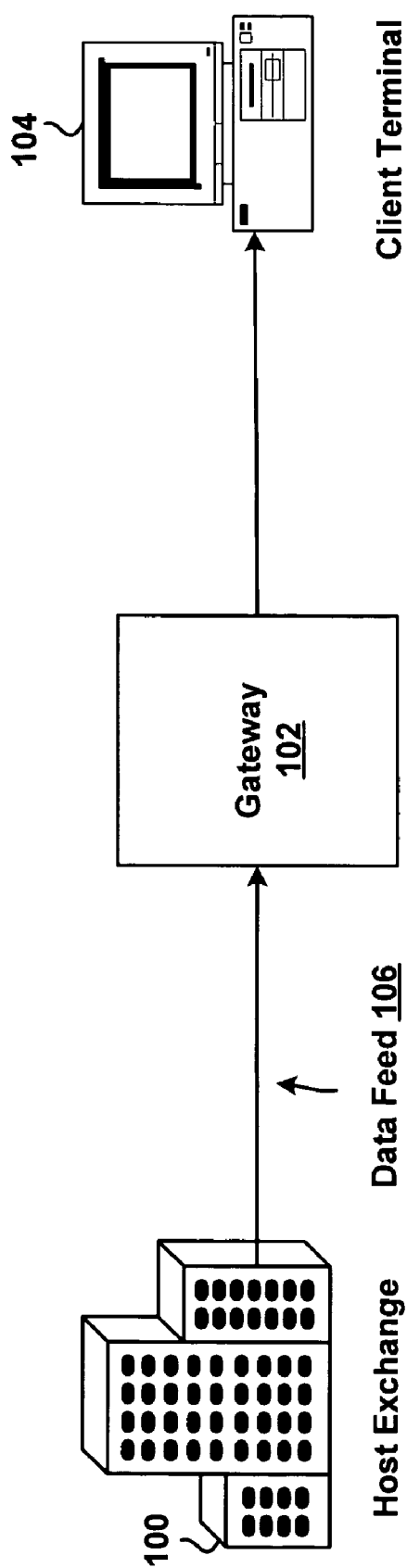
FIG. 1 is an example of a network configuration for a communication system utilized to access one or more exchanges.

FIG. 1 is a block diagram that illustrates an electronic trading system 100 in accordance with the preferred embodiment. The system 100 includes at least one host exchange 102 and one or more client devices 104. Intermediate devices such as gateways, routers, and other such types of network devices may be used to assist the client device 104 and host exchange 102 in communicating over network(s) 106. Intermediate devices, additional host exchanges, and additional client devices are not shown in FIG. 1 for sake of clarity. It should be understood, however, that other types of network configurations known in the art may be used as the system 100.

A. Host Exchange

The host exchange 102 may include the Chicago Board of Trade ("CBOT"), the New York Stock Exchange ("NYSE"), the Chicago Mercantile Exchange ("CME"), the Xetra (a German stock exchange), or the European derivatives market ("Eurex"). The host exchange 102 might also refer to other systems, from basic to more complex systems, which automatically match incoming orders. These example host exchanges and other host exchanges are well known in the art. Communication protocols required for connectivity to one of these host exchanges are also well known in the art.

An exchange 102, 104, 106 can implement numerous types of order execution algorithms, sometimes the type of algorithm depends on the tradeable object being traded. The preferred embodiments may be adapted by one skilled in the art to work with any particular order execution algorithm. Some example order execution algorithms include first-in-first-out and pro rata algorithms. The first-in-first-out (FIFO) algorithm, used for some markets listed with Eurex for example, gives priority to the first person to place an order. The pro rata algorithm, used for some markets listed with LIFFE for example, splits all orders for the same price. The present invention is not limited to any particular type of order execution algorithm.

Regardless of the type of order execution algorithm used, each host exchange including the host exchange 102 preferably provides similar types of information to the subscribing client devices 104. The information that the host exchange 102 provides is referred to hereinafter as market information. Market information may include data that represents just the inside market, where the inside market is the lowest sell price (best offer or best ask) and the highest buy price (best bid) at a particular point in time. The market information 108 may also include market depth. Market depth refers to quantities available at the inside market and can also refer to quantities available at other prices away from the inside market. The market depth of a tradeable object is preferably represented in an exchange order book which provides at least some of the current bid and ask prices and associated quantities in the market for that tradeable object. This information, or some portion of it, is preferably transmitted to client devices in the form of market updates in a data feed. Market information can contain other types of market information such as the last traded price (LTP), the last traded quantity (LTQ), and/or order fill information. The contents of market information are generally up to the host exchange 102.

As previously described, the preferred embodiment may be used to trade any tradeable object. As used herein, the term "tradeable object," refers simply to anything that can be traded with a quantity and/or price. It includes, but is not limited to, all types of tradeable objects such as financial products, which can include, for example, stocks, options, bonds, futures, currency, and warrants, as well as funds, derivatives and collections of the foregoing, and all types of commodities, such as grains, energy, and metals. The tradeable object may be "real", such as products that are listed by an exchange for trading, or "synthetic", such as a combination of real products that is created by the user. A tradeable object could actually be a combination of other tradeable object, such as a class of tradeable objects.

B. Client Device

In the preferred embodiment, the client device 104 is a computer that provides an interface to trade at the host exchange 102. An example client device is a personal computer, laptop computer, hand-held computer, and so forth. The client device 104, according to the preferred embodiment, includes at least a processor and memory. The processor and memory, which are both well-known computer components, are not shown in the figure for sake of clarity. Memory may include computer readable medium. The term computer readable medium, as used herein, refers to any medium that participates in providing instructions to the processor for execution. Such a medium may take many forms, including but not limited to, non-volatile media, volatile media, and transmission media. Non-volatile media includes, for example, optical or magnetic disks, such as a storage device. Volatile media may include dynamic memory, such as main memory or RAM (random access memory). Common forms of computer-readable media include, for example, a floppy disk, a flexible disk, a hard disk, a magnetic tape, or any other magnetic medium, a CD-ROM, any other optical medium, punch cards, paper tape, any other physical medium with patterns of holes, a RAM, a PROM, and EPROM, a FLASH-EPROM, and any other memory chip or cartridge, or any other medium from which a computer can read.

In the preferred embodiment, the client device 104 receives market information 108 from the host exchange 102. The market information is received over the network(s) 106. The network(s) 106 may include a group of computers and/or associated devices that are connected by communications facilities, and can involve permanent connections, such as cables, or temporary connections made through telephone or other communication links. The network(s) 106 can be as small as a LAN (local area network) consisting of a few computers, printers, and other devices, or it can consist of many small and large computers distributed over a vast geographic area (WAN or wide area network), or it can consist of both types of networks (both LAN and WAN).

According to the preferred embodiment, market information is displayed to the trader on the client device 104. Preferably, the market information, or a portion thereof, is arranged using techniques described herein and is displayed on the visual output device or display device of the client device 104. The output device can be any type of display. For example, the display could be a CRT-based video display, an LCD-based or a gas plasma-based flat-panel display, or some other type of display. The present invention is not limited to any type of display.

Upon viewing market information or a portion thereof, a trader may wish to send transaction information to the host exchange 102. To do so, the trader may input the transaction information into the client device by typing into a keyboard, through a mouse, or some other input device. Preferably, transaction information includes an order to buy or an order to sell a tradeable object. An order can have multiple parameters, price, quantity, a type of order (e.g., a buy or sell), but the present invention is not limited to a particular number of parameters that may be used to characterize the order. According to another embodiment, transaction information might also refer to other order related transactions such as delete order messages, cancel and replace messages, and so forth. There are many different types of messages and order types that can be submitted to the host exchange 102, all of which are considered various types of transaction information. Then, transaction information is sent from the client device 104 to the host exchange 102 over the network(s) 106.

As previously described, FIG. 1 provides an example system overview according to a preferred embodiment. Various changes and/or modifications may be made to the system and still fall within the scope of the present invention. For example, it should be understood that the present invention is not limited to any particular network architecture or configuration such as described in FIG. 1. The present invention may be applied with utility on any electronic device in any network that can be used for electronic trading.

C. Trading Interface

A commercially available trading application that allows a user to trade in a system like the one shown in FIG. 1 is X_TRADER® from Trading Technologies International, Inc. of Chicago, Ill. X_TRADER® also provides an electronic trading interface, referred to as MD Trader™, in which working orders and/or bid and ask quantities are displayed in association with a static axis of prices. However, the preferred embodiments are not limited to any particular product that performs translation, storage and display functions.

The example embodiments for automatic scalping will be described below in reference to the MD Trader™-style display that displays information, such as orders to buy or orders to sell, in association with price levels arranged along a common static axis or scale of prices. The quantities associated with the orders to buy are preferably displayed in a bid display region, and quantities associated with orders to sell are preferably displayed in an ask display region. According to one embodiment, bid and ask display regions preferably have a plurality of locations, where each location corresponds to a price level along the common static axis of prices.

The quantities for each order being displayed via the MD Trader™-style display may be displayed using any indicator types. For example, the indicator can be a graphical representation of quantity (e.g., colors, bars, etc.) or can simply be a number. The price levels are fixed in relation to bid and ask display regions such that the indicators displayed in these regions can move relative to the display (e.g., the screen). For example, the portion of the static axis that is being viewed can be changed by scrolling up or down the axis or by entering a repositioning command. One embodiment using this type of display system displays market information with respect to a vertical axis so that the market information fluctuates logically up and down relative to the axis as the market prices fluctuate. It should be understood that while the example embodiments are described in reference to the MD Trader™-style display, the present invention is not limited to any particular display and could be used with different or equivalent displays. Further, it should be understood that many modifications to the MD Trader™-style display are possible as well. For example, information related to a tradable object may be displayed horizontally relative to a horizontally oriented axis, n-dimensionally, or in any other fashion.

Figure 2:
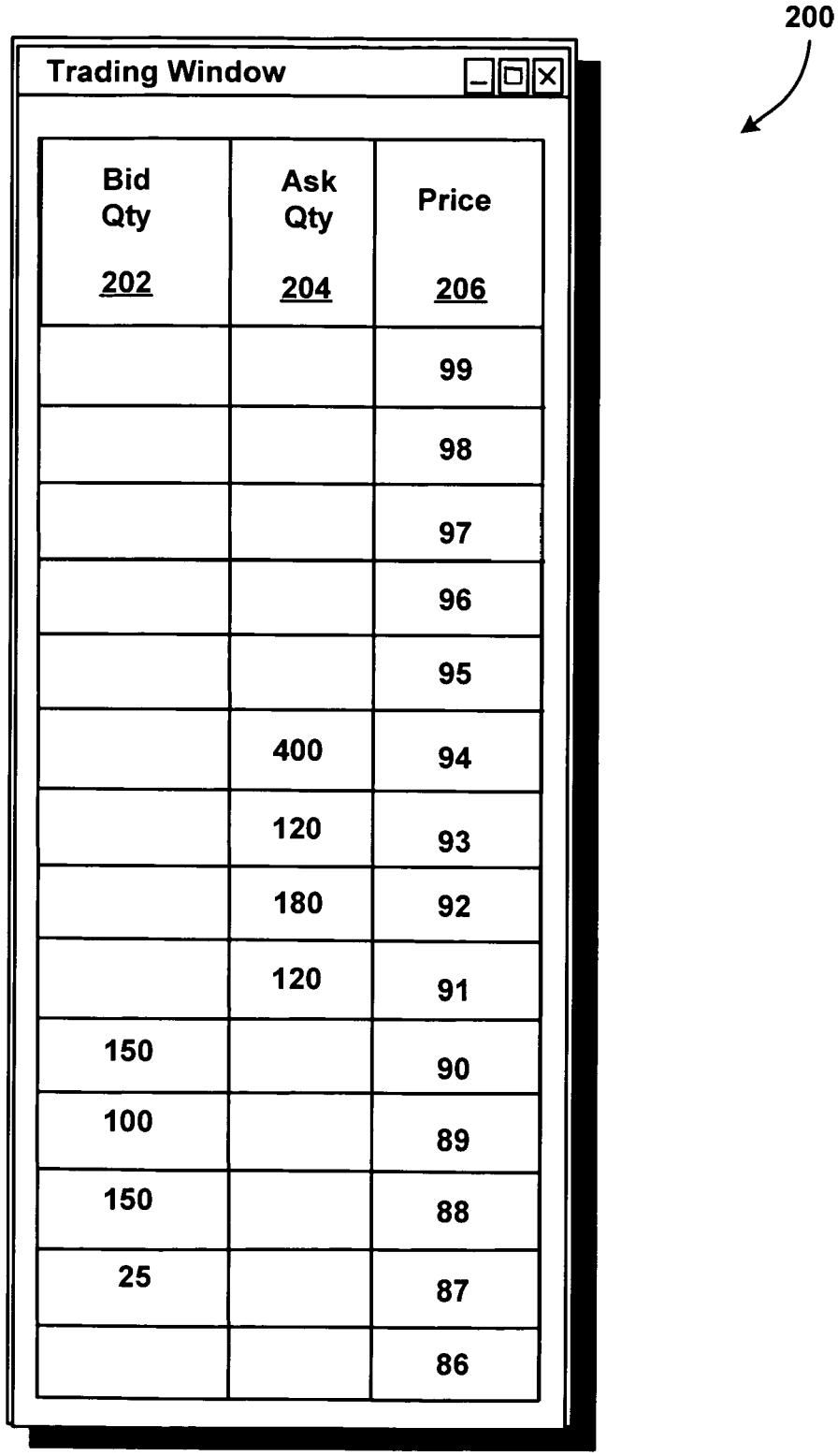
FIG. 2 is a block diagram illustrating a trading interface that allows a trader to enter orders on an electronic exchange.

In a fast moving market, where varying price levels are trading (i.e., bids and offers entering the market are being matched at different prices), it is beneficial for a trader to be able to quickly enter orders and analyze market information. FIG. 2 illustrates a display 200 that allows a trader to quickly enter orders at specific price levels by clicking next to a static axis of prices, displayed as a static column, and to quickly and easily see information such as working orders. The display 200 may be used to display traded quantity by price as will be described in greater detail below.

The display may generally include a number of different regions that may be used to display market information. As shown in FIG. 2, the display 200 includes a price column 206, a bid quantity ("Bid Qty") column 202, and an ask quantity ("Ask Qty") column 204. In the preferred embodiment, the three columns are shown in different colors so that a trader can distinguish them. Further, it should be understood that a trader has the ability to control the arrangement of the columns on the display. For example, the Bid Qty column 202 and the Ask Qty column 204 could be positioned to the left of the price column 200. However, it should be understood that other arrangements are possible as well. The Bid Qty column 202 displays bid quantities, and the Ask Qty column 204 displays ask quantities. The representative prices for a given tradable object are shown in the price column 206.

As mentioned in the preceding paragraphs, the price column 206 includes a static axis of prices. It should be understood that static, in the context of the embodiments described hereinafter, does not mean immovable, but rather fixed in relation. For example, with a static axis of prices, the axis itself may be movable (e.g., via a recentering, repositioning, or scrolling command), but the prices represented remain fixed in relation to the market information, subject to consolidation or expansion. Further, for example, the static axis of prices may stay fixed even when the market moves or when the market changes unless a repositioning, recentering or scrolling command is received. In the preferred embodiment, the static axis of prices is associated with a plurality of locations, and each location corresponds to a different price. According to one example, the price axis does not move in response to price changes, such as price addition or deletion in the exchange order book. Thus, when an exchange order book is updated to include quantity at a new price or to remove a price, the price axis preferably does not move, and the order data is mapped to the predetermined location along the price axis corresponding to the new price. Further, as an example, the price axis preferably does not move (unless, for example, a repositioning, recentering or scrolling command is received) in response to a change in the inside market. It should also be understood that when the static price axis is described as not moving herein, the present application is referring to movements of the price axis within the trading interface display and not to movements caused by moving the location of the trading interface display on a screen. For example, the trading interface display can be a window on a computer display and dragging that window to a new location on the computer display would not be considered moving the price axis. It should be understood that in one embodiment, the static axis of prices could be displayed in any manner, including in a row, on any angle, or n-dimensionally, without departing from the invention. Further, alternatively, prices do not need to be displayed.

It should be understood that the display 200 is not limited to the columns and information described in reference to FIG. 2, and various other information may be presented in relation to the display 200. More information relating to the X_TRADER® and the MD Trader™-style display are described in U.S. patent application Ser. No. 09/590,692, entitled "Click Based Trading With Intuitive Grid Display of Market Depth," filed on Jun. 9, 2000, U.S. patent application Ser. No. 09/971,087, entitled "Click Based Trading With Intuitive Grid Display of Market Depth and Price Consolidation," filed on Oct. 5, 2001, and U.S. patent application Ser. No. 10/260,643, entitled "System and Method For Displaying Highest And Lowest Traded Prices Of Tradable Object," filed on Sep. 30, 2002, the contents of which are incorporated herein by reference. Moreover, the trading application may implement tools for trading tradable objects that are described in U.S. patent application Ser. No. 10/125,894, filed on Apr. 19, 2002, entitled "Trading Tools for Electronic Trading," the contents of which are incorporated herein by reference. The specific features of the embodiments of a display as in FIG. 2 are an example of one embodiment of a screen that can be used with the present invention. It should be understood that the present invention is not limited, however, to such a screen display, and could be used with any type of screen display.

III. Automatic Scalping

In accordance with one embodiment, the trading application may include an automatic scalping application that provides a way to automatically enter orders for a trader, or to automatically enter offsetting orders once a fill of another manually or automatically entered order is detected. It should be understood that the automatic scalping application may be located on a client terminal or any other network entity, such as a gateway, in communication with the client terminal. Using the methods described below, the automatic scalping application may assist scalpers to enter their orders faster and allows them to make higher profits or incur lower losses based on market movements. As explained earlier, scalping is a term that is well known in trading, and it refers to a trading technique in which a trader trades for relatively smaller gains over a short period of time.

In the embodiments described hereinafter, the automatic scalping application facilitates scalping by providing the user with an automatic order entry mechanism. The automatic order entry mechanism may be activated based on a user input that in turn may activate a dialog box via which a trader may enter scalping parameters. Additionally, the user input may activate one or more graphical indicators associated with one or more prices at which a tradeable object can be automatically traded. In such an embodiment, the graphical indicator(s) may be displayed via the trading interface in relation to the static axis of prices, and a trader may manipulate the indicators using a mouse, for example. However, other actuating mechanisms can be used as well to activate automatic scalping, such as, for example, a scalping icon displayed on the user interface that may be activated and deactivated by a trader during a trading day.

It should be understood that many different embodiments may be used to assist a trader in setting up automatic scalping parameters as well as indicators associated with prices at which an order may be automatically placed on the market by the automatic scalping application. In one embodiment, a trader may use a mouse input to position a horizontal line or any other type of graphical indicator associated with a target price, based on which the automatic scalping application may automatically enter orders to a host exchange. More specifically, the automatic scalping application will automatically enter orders depending on an inside market position relative to the target price. Alternatively, the automatic trading application may only enter orders automatically upon detecting that one of the manually entered orders has been filled.

Figure 3:
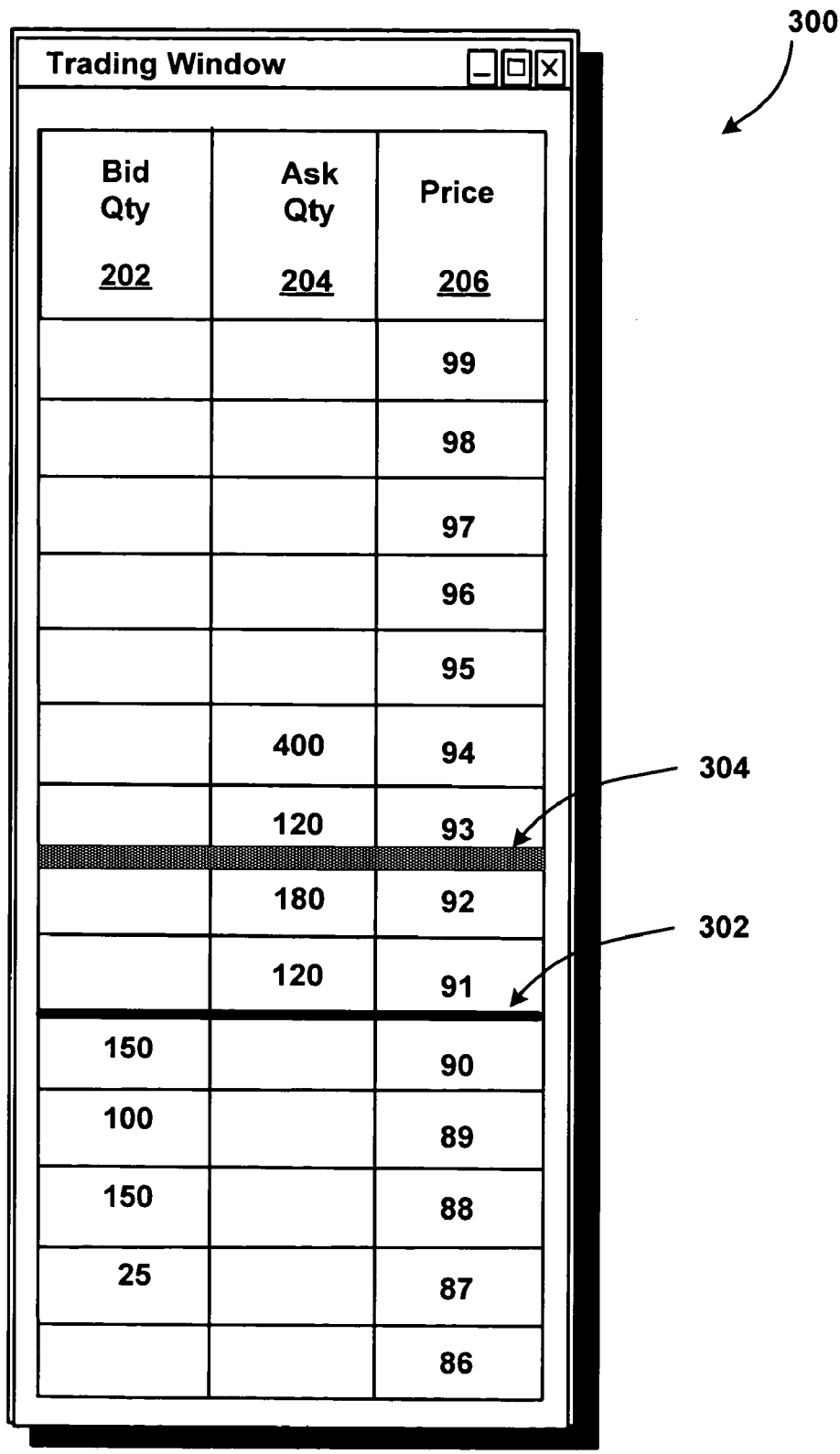
FIG. 3 is a block diagram illustrating a trading interface with a graphical indicator associated with a price level based on which one or more orders may be automatically sent to an electronic exchange.

FIG. 3 illustrates a trading interface 300 displaying a graphical indicator associated with a price level based on which one or more orders may be automatically submitted to an electronic exchange. The trading interface 300 displays an inside market indicator 302, and a graphical indicator 304 associated with a price level based on which the automatic scalping application may enter orders to an exchange. It should be understood that the graphical indicator 304 can have any format, and the format of the indicator 304 can be user configurable. For example, the indicator 304 is not limited to extending through the bid, ask, and price columns, and instead, could be displayed in the price column 206, or in relation to any other column. In one embodiment, when a trader enables the auto scalper feature, the graphical indicator 304 may be automatically displayed via the trading interface 300 at the mid-point of prices displayed via the trading interface, or in any other location on the trading interface. Once the indicator 304 is displayed via the trading interface 300, the trader may simply drag and drop the indicator 304 at a desired location or scroll the wheel of the trader's mouse up or down until the indicator is positioned at a desired price level. Using such a method, when a trader scrolls the wheel down and up, the indicator 304 may respectively move down and up on the trading interface. Once the trader positions the indicator 304 at the desired price level, the automatic scalping application may automatically enter orders based on position of the inside market in relation to the displayed indicator, one method of which will be described hereinafter.

Figure 4:
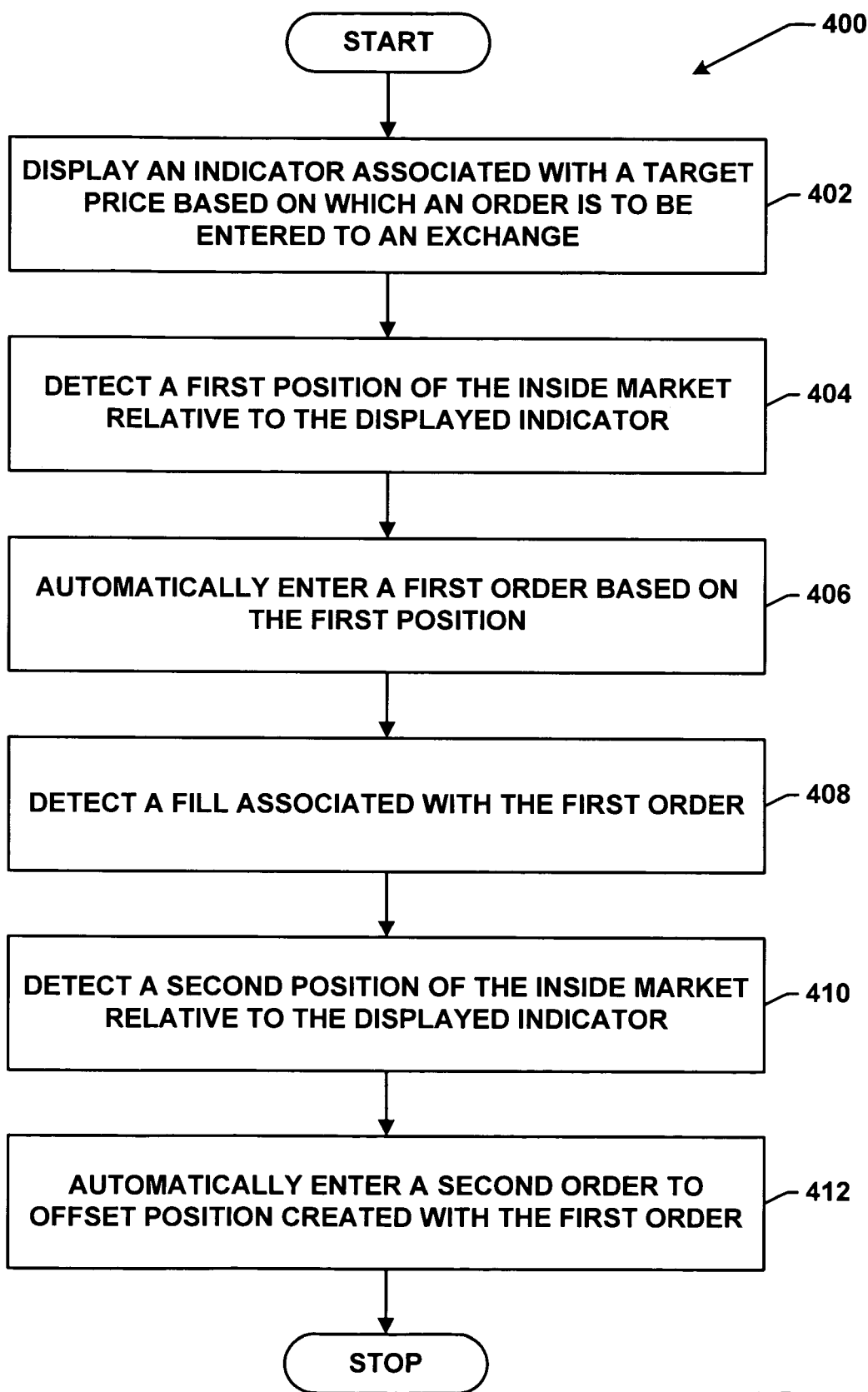
FIG. 4 is a flow chart illustrating a method for automatic scalping according to one embodiment using one graphical indicator associated with a price level.

FIG. 4 is a flow chart illustrating a method 400 for automatic scalping in an electronic trading environment according to one embodiment.

At step 402, the trading interface displays a graphical indicator associated with a target price, based on which orders may be automatically entered to an exchange. As explained in reference to the preceding figure, a trader may first activate the automatic scalping mechanism that may then automatically trigger a display of the graphical indicator via the trading interface. Once the indicator is displayed on the interface, the trader may reposition the graphical indicator to the desired target price level. Alternatively, a trader may activate an automatic scalping graphical interface At step 404, the automatic scalping application detects a first position of the inside market relative to the displayed indicator. For example, the first position may be detected when a price level of the inside market is above the target price level associated with the indicator. At step 406, the automatic scalping application automatically submits a first order to the exchange. When the inside market is above the target price level, the scalping application may submit a sell order. It should be understood that a trader may define a number of ticks between the inside market and the target price that, when detected by the scalping application, may activate submission of the first order to the exchange. Further, the trader can control a price level at which the first order is placed on the market so that the order is placed a number of ticks away from the target price. Further, once the inside market crosses the target price, the trading application may automatically place the order at a desired price level away from the target price. Alternatively, once the inside market reaches a predetermined price level, the order may be placed at the inside market.

At step 408, the automatic scalping application detects a fill associated with the first order. Once the first order is fully or partially filled, the scalping application may start monitoring the market movement until, at step 410, the second position of the inside market relative to the displayed graphical indicator is detected. According to an example embodiment, the second position is detected when the inside market goes back to (moves in a downward direction), or crosses the target price identified with the graphical indicator. Once the second position is detected, at step 412, the scalping application automatically enters a second order to offset the short position created with the first order. Similarly to the first order, a trader may configure a price level, such as a number of ticks away from the target price, at which the second order should be placed. The second order may be a market order or an order that the trading application may automatically place on the market once the application detects that the inside market has moved from a position above the target price to a position at or below the target price associated with the graphical indicator.

The method 400 for placing automatic orders has been described in relation to automatically placing a sell order when the inside market moves above the target price level, and then automatically submitting an offset buy order, once the market moves back to the target price. However, it should be understood that the method 400 may also be used when the market moves in opposite, upward direction. In such an embodiment, the trading application may first automatically place a buy order (when the market moves below the target price level) and, when the buy order is filled and the market moves back to the target price, the trading application could place a sell order to offset or close position created with the buy order and allow a trader to make profit.

Further, the method 400 has been described in reference to the embodiment in which two orders have been automatically placed on the market by the trading application. However, it should be understood that the method described above is not limited to the fully automated process. Alternatively, a trader can enter the first order manually, and once the scalping application detects the fill associated with the first order and then the movement of the market to the target price, the scalping application may automatically enter a second order to the market to offset position created with the first order. In addition, in another embodiment the method can also provide for the automatic entry of stop/loss orders in conjunction with the second order. The stop order would preferably be automatically canceled if the second order gets filled or canceled. Likewise, the second order is preferably cancelled if the stop order gets filled or cancelled. Such orders can be used to limit losses in the event the market moves in the wrong direction. If a trader is long, the stop loss order would be a sell stop below the inside market. If the trader is short, the stop loss order would be a buy stop above the inside market. Such orders can be entered at any price level based on a preset parameter, such as number of ticks above or below the market. The stop/loss order can be also be trailing stop order which automatically moves with the market in one direction. For example, a trailing sell stop order that is defined to be 3 ticks below the inside market will move up as the inside market moves up. Such trailing stop orders do not typically move if the market is moving towards the price of the stop order. Many exchanges support stops as a particular type of order. With respect to exchanges that do not offer this type of order, the trading software can synthetically provide for a trigger order that accomplishes the same result.

In another embodiment, instead of displaying a single indicator, an indicator range associated with a plurality of prices at which the tradable object can be automatically traded may be displayed instead. When a trader activates the automatic scalping, a trading interface may display a pair of graphical indicator bars, and the trader can move them in relation to the static axis of prices. Preferably, a trader can manipulate and position the indicator bars at the desired price levels by simultaneously pressing the control key and scroll wheel on the user's mouse. It should be understood that other mechanisms to activate and control position of the indicator bars can be used instead. For example, a dialog box generated by the trading application can be used to activate and control price levels associated with the indicator bars.

In an embodiment in which a mouse input is used to position parallel horizontal lines, the indicator bars define a price range where buy and sell quantities may be automatically entered upon detecting a fill associated with another order, such as a manually entered order, for example. More specifically, this feature automatically enters sell quantities when a trader's manually entered buy quantity is filled. Likewise, this feature will automatically enter buy quantities when a trader's manually entered sell quantity is filled.

Figure 5:
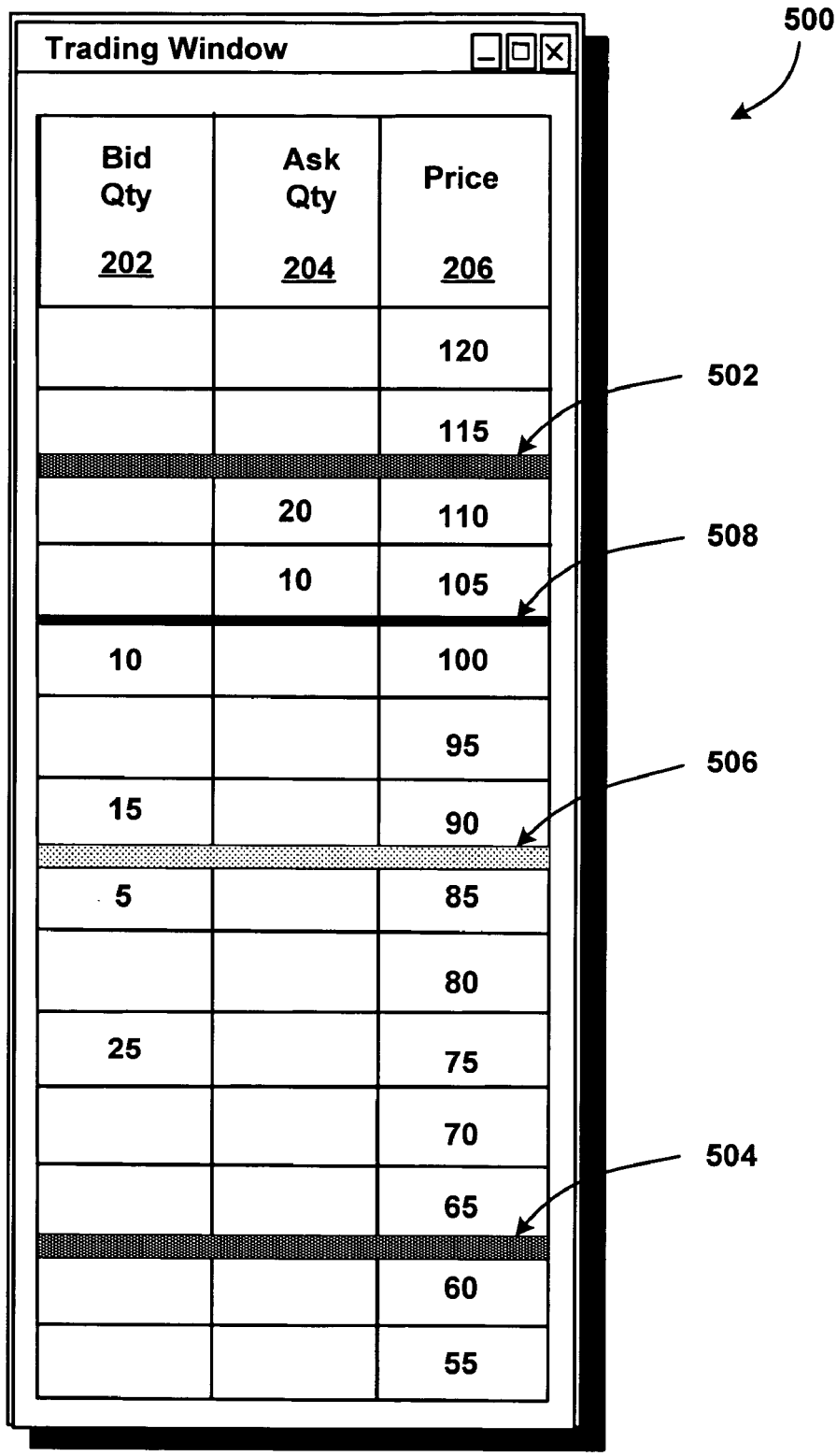
FIG. 5 is a block diagram illustrating a trading interface displaying an indicator range associated with a plurality of prices based on which one or more orders may be automatically sent to an electronic exchange.

FIG. 5 is a block diagram illustrating an example trading interface displaying an indicator range associated with a plurality of prices at which orders can be automatically entered on the market.

In a preferred embodiment, the indicator bars 502 and 504 span the bid column 202, the ask column 204, and the price column 206; however, alternatively, the indicators may be displayed in relation to a single column and may take any user-configurable format. The indicator bars 502 and 504 are set with the highest price at 110 and the lowest price at 65. The inside market, as indicated by the black line 508, is a buy price at 100, and a sell price at 105. Once the auto scalper application is activated, the indicators may be initially positioned in the mid-point of the prices displayed on the trader's display screen. In FIG. 5, the mid-point of prices is displayed with the indicator 506 and is between the prices 85 and 90.

Once the indicators are displayed at the mid-point of prices, a trader may scroll the wheel of the trader's mouse up causing the indicators to move further apart, thus leaving a greater number of prices within the range of the indicator bars 502 and 504. Consequently, when the trader scrolls the wheel down, the indicator bars move closer together, near to the mid-point, reducing the number of prices within the indicator range.

Figure 6:
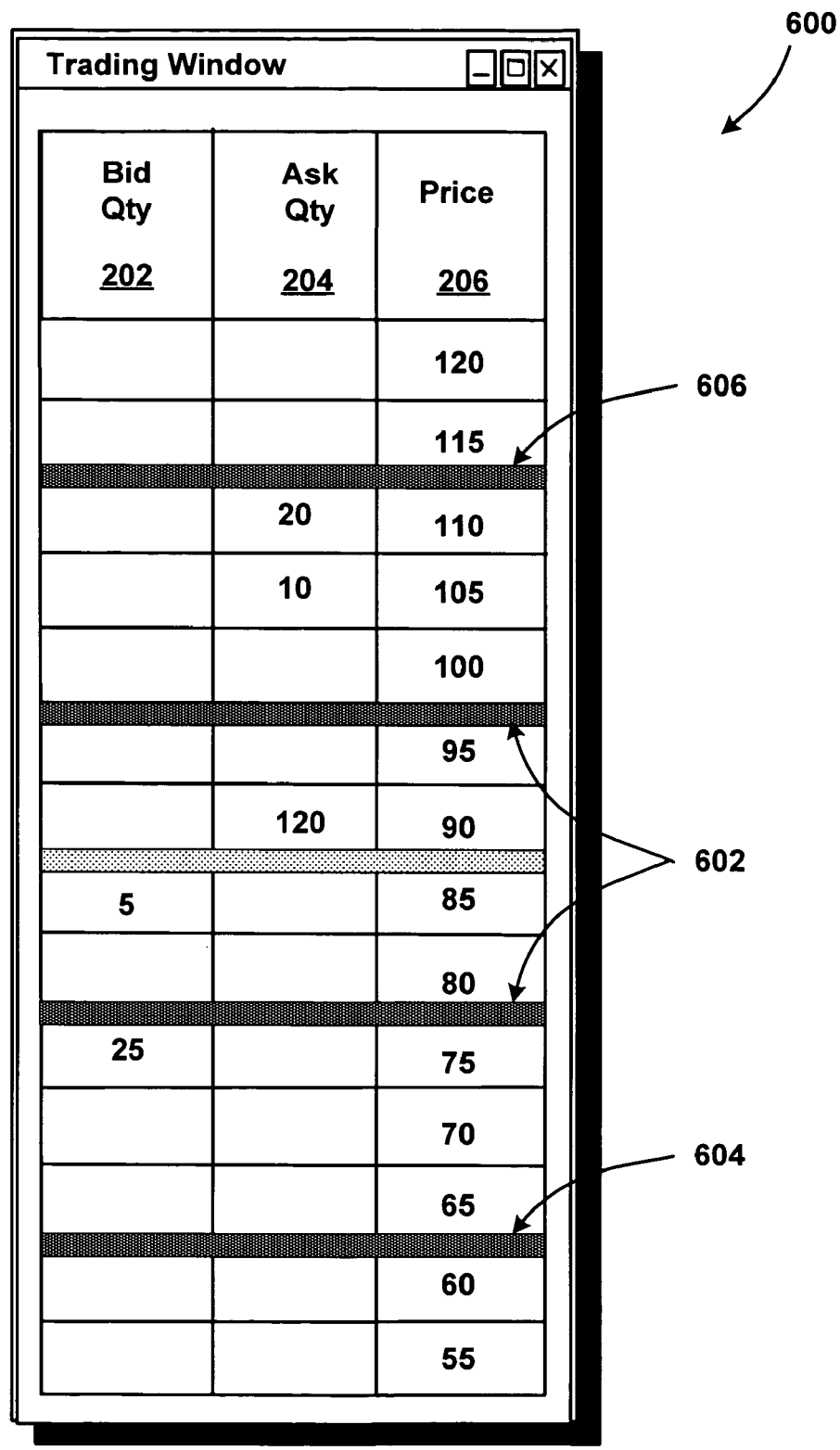
FIG. 6 is a block diagram illustrating a trading interface displaying an indicator range that can be repositioned by a trader to desired price levels.

FIG. 6 illustrates different positions of the indicator bars on the trading interface. When a trader activates the auto scalper application, two indicators, such as indicators 602, may be displayed in relation to a mid-point of prices. A trader may then scroll the wheel of the trader's mouse up or down causing the indicators to move in relation to the static axis of prices to indicator positions 604 and 606, thus setting a wider price range at which orders may be automatically placed on the market by the trading application. However, it should be understood that different methods for moving indicators in relation to the static axis of prices can be used as well. For example, a trader may drag and drop one of the indicators to a desired price level. Alternatively, a graphical interface may be used to specify price levels at which the indicators should be displayed on the trading interface.

In one embodiment, as explained earlier, the trading application may automatically enter an order to an exchange to offset position created with a fill associated with a manually entered order. A trader's position may be defined as a difference between the total quantity bought and the quantity sold, and the trader is considered to have a long position when the quantity bought is greater than the quantity sold. Similarly, the trader is considered to have a short position when the quantity sold is greater than the quantity bought. The more quantity the trader owns, the longer the trader's position will be. Conversely, the more quantity the trader sells, the shorter the trader's position will be. It may be desirable, however, to have neither a long nor short position, referred to as a closed position, at the time of each day's trading session. If the buy quantity that the trader has entered in the market is filled, thus giving the trader a long position, the system, if actuated by the user, may automatically enter a duplicate sell quantity, which, when filled, will close the trader's position. Likewise, if the sell quantity that the trader has entered in the market is filled, the system may automatically enter a duplicate buy quantity, which when filled will close the trader's position. The automatic scalper application automatically and preferably, immediately enters a duplicate buy or sell quantity, which when filled will close the trader's position, preventing the trader from carrying a long or short position for an extended period of time.

When a trader defines an indicator ranges associated with a plurality of prices, the automatic scalper application may select a price, within the indicator range, at which to automatically enter an order based on the preferences or rules preset by a trader. In one embodiment, a trader may specify that any sell/buy order entered by the automatic scalper application should be entered a specific number of ticks away from the inside market. For example, the order that is automatically entered may be, in a case of a sell order, at the lowest price above the inside market within the range of the indicator bars, and in the case of a buy order, at the lowest price below the inside market within the range of the indicator bars. Alternatively, the order may be a market order.

Further, it should be understood that an order that is automatically entered, may be at a price or distributed between prices calculated pursuant to any algorithm. For example, the quantity ordered may be evenly spread among prices above (in the case of a sell order), or below (in the case of a buy order) the inside market and within the range of indicator bars. The preferred embodiments are not limited to any particular technique for determining the price or prices at which the automatic order is entered. In the preferred embodiment, the user may set rules defining at what prices (whether at the best price or some other price) and when (whether immediately or upon detecting a predetermined market movement) the automatic scalper application sends automatic orders to an exchange.

Further, alternatively, the automatic scalper application may be used to set one range, using, for example, indicator bars, for buying quantity and another range for selling quantity, at the same time. In such an embodiment, the automatic scalper application, instead of waiting to detect a fill on a manually entered order, may automatically place buy and sell orders within the ranges set by a trader. For example, if the inside market is within the price range associated with the indicator bars for buying quantity, the automatic scalper application may send a buy order to an exchange. Then, once the inside market moves to the price range associated with the indicator bars for selling quantity, the automatic scalper application may send a sell order to the exchange to offset position created with the buy order. It should be understood that a trader may control the price levels at which the two orders are placed.

Further, it should be understood that the automatic scalping methods are not limited to a single scalping range, and multiple scalping ranges, using different pairs of indicator bars, may be activated in a single trading window. The different ranges may be distinguished by using, for example, different colors for the different pairs of indicator bars. In such an embodiment, when the market moves into one range, the automatic scalping application may enter orders at the price levels of that range. Further, scalping ranges may overlap so that, for example, the prices associated with indicator bars for selling quantities of one range may overlap with the prices associated with indicator bars for buying quantities of another range.

It should be understood that the above description of the preferred embodiments, alternative embodiments, and specific examples, are given by way of illustration and should not be viewed as limiting. Further, many changes and modifications within the scope of the present embodiments may be made without departing from the spirit thereof, and the present invention includes such changes and modifications. For example, it should be understood that the randomization methods described above may be used separately, or in any combination specified by the user.

Further, it will be apparent to those of ordinary skill in the art that methods involved in the system for automatic scalping in an electronic trading environment may be embodied in a computer program product that includes one or more computer readable media. For example, a computer readable medium can include a readable memory device, such as a hard drive device, CD-ROM, a DVD-ROM, or a computer diskette, having computer readable program code segments stored thereon. The computer readable medium can also include a communications or transmission medium, such as, a bus or a communication link, either optical, wired or wireless having program code segments carried thereon as digital or analog data signals.

The claims should not be read as limited to the described order or elements unless stated to that effect. Therefore, all embodiments that come within the scope and spirit of the following claims and equivalents thereto are claimed as the invention.

We claim:

1. A method for automatic scalping a tradable object in an electronic trading environment, the method comprising:

receiving a market data feed from an electronic exchange, the market data feed comprising an inside market with a best bid price and a best ask price currently available for the tradeable object;

displaying a bid display region and an ask display region in relation to a common static axis of prices, each region comprising a plurality of locations, wherein each location corresponds to a price level along the common static axis of prices, wherein the bid display region comprises a first indicator displayed in a location corresponding to the best bid price currently available for the tradeable object, and wherein the ask display region comprises a second indicator displayed in a location corresponding to the best ask price currently available for the tradeable object;

displaying along the common static axis of prices a target price indicator associated with a target price based on which an order is to be automatically entered for the tradable object;

detecting at a computer device a series of upward price increases based on best bid prices and best ask prices being received from the electronic exchange in the market data feed;

in the series of the upward price increases, responsive to detecting that the inside market crosses the target price associated with the target price indicator, automatically entering a first order to sell the tradeable object;

determining at a computer device that at least a portion of a quantity associated with the first order to sell has been filled;

detecting at a computer device a series of downward price decreases based on best bid prices and best ask prices being received from the electronic exchange in the market data feed; and in the series of the downward price decreases, responsive to detecting that the inside market crosses the target price associated with the target price indicator, automatically entering a second order to buy the tradeable object to offset a position created with the first order to sell, wherein a quantity of the second order to buy is set equal to the quantity of the first order to sell that was filled.

2. A computer readable medium having stored therein instructions to execute a method for automatic scalping a tradable object in an electronic trading environment, the method comprising:

receiving a market data feed from an electronic exchange, the market data feed comprising an inside market with a best bid price and a best ask price currently available for the tradeable object;

displaying a bid display region and an ask display region in relation to a common static axis of prices, each region comprising a plurality of locations, wherein each location corresponds to a price level along the common static axis of prices, wherein the bid display region comprises a first indicator displayed in a location corresponding to the best bid price currently available for the tradeable object, and wherein the ask display region comprises a second indicator displayed in a location corresponding to the best ask price currently available for the tradeable object;

displaying along the common static axis of prices a target price indicator associated with a target price based on which an order is to be automatically entered for the tradable object;

detecting at a computer device a series of upward price increases based on best bid prices and best ask prices being received from the electronic exchange in the market data feed;

in the series of the upward price increases, responsive to detecting that the inside market crosses the target price associated with the target price indicator, automatically entering a first order to sell the tradeable object;

determining at a computer device that at least a portion of a quantity associated with the first order to sell has been filled;

detecting at a computer device a series of downward price decreases based on best bid prices and best ask prices being received from the electronic exchange in the market data feed; and in the series of the downward price decreases, responsive to detecting that the inside market crosses the target price associated with the target price indicator, automatically entering a second order to buy the tradeable object to offset a position created with the first order to sell, wherein a quantity of the second order to buy is set equal to the quantity of the first order to sell that was filled.

3. The method of claim 1, wherein the inside market crosses the target price in the series of upward price increase when a position of the inside market is above the target price.

4. The method of claim 3, wherein the inside market crosses the target price in the series of downward price decreases when a position of the inside market is below the target price.

5. A method for automatic scalping a tradable object in an electronic trading environment, the method comprising:

receiving a market data feed from an electronic exchange, the market data feed comprising an inside market with a best bid price and a best ask price currently available for the tradeable object;

displaying a bid display region and an ask display region in relation to a common static axis of prices, each region comprising a plurality of locations, wherein each location corresponds to a price level along the common static axis of prices, wherein the bid display region comprises a first indicator displayed in a location corresponding to the best bid price currently available for the tradeable object, and wherein the ask display region comprises a second indicator displayed in a location corresponding to the best ask price currently available for the tradeable object;

displaying along the common static axis of prices a first indicator range associated with a first plurality of prices at which orders to buy the tradable object can be automatically placed, and displaying along the common static axis of prices a second indicator range associated with a second plurality of prices at which orders to sell the tradeable object can be automatically placed;

in a series of downward price increases based on best bid prices and best ask prices being received from the electronic exchange in the market data feed, responsive to detecting at a computer device when the inside market is within the first indicator range, automatically entering a first order to buy the tradeable object at one or more prices levels within the first indicator range;

detecting at a computer device that at least a portion of a quantity of the first order to buy the tradable object has been filled; and in a series of upward price increases based on best bid prices and best ask prices being received from the electronic exchange in the market data feed, responsive to detecting at a computer device when the inside market is within the second indicator range, automatically entering a second order to sell the tradable object at one or more price levels within the second indicator range to offset a position created with the first order, wherein the second order has an order quantity equal to the quantity of the first order to buy that was filled.

6. A computer readable medium having stored therein instructions to execute a method for automatic scalping a tradable object in an electronic trading environment, the method comprising:

receiving a market data feed from an electronic exchange, the market data feed comprising an inside market with a best bid price and a best ask price currently available for the tradeable object;

displaying a bid display region and an ask display region in relation to a common static axis of prices, each region comprising a plurality of locations, wherein each location corresponds to a price level along the common static axis of prices, wherein the bid display region comprises a first indicator displayed in a location corresponding to the best bid price currently available for the tradeable object, and wherein the ask display region comprises a second indicator displayed in a location corresponding to the best ask price currently available for the tradeable object;

displaying along the common static axis of prices a first indicator range associated with a first plurality of prices at which orders to buy the tradable object can be automatically placed, and displaying along the common static axis of prices a second indicator range associated with a second plurality of prices at which orders to sell the tradeable object can be automatically placed;

in a series of downward price increases based on best bid prices and best ask prices being received from the electronic exchange in the market data feed, responsive to detecting at a computer device when the inside market is within the first indicator range, automatically entering a first order to buy the tradeable object at one or more prices levels within the first indicator range;

detecting at a computer device that at least a portion of a quantity of the first order to buy the tradable object has been filled; and in a series of upward price increases based on best bid prices and best ask prices being received from the electronic exchange in the market data feed, responsive to detecting at a computer device when the inside market is within the second indicator range, automatically entering a second order to sell the tradable object at one or more price levels within the second indicator range to offset a position created with the first order, wherein the second order has an order quantity equal to the quantity of the first order to buy that was filled.

7. The method of claim 5, wherein displaying a first indicator range associated with a plurality of prices comprises:

displaying a first range indicator in relation with a first price on the common static axis of prices, the first indicator associated with a highest price of the first plurality of prices; and displaying a second range indicator in relation with a second price on the common static axis of prices, the second indicator associated with a lowest price of the first plurality of prices;

and wherein displaying a second indicator range comprises:

displaying a third range indicator in relation to with a third price on the common static axis of prices, the third indicator associated with a highest price of the second plurality of prices; and displaying a fourth range indicator in relation with a third price on the common static axis of prices, the fourth indicator associated with a lowest price of the second plurality of prices.

8. The method of claim 5, wherein the price associated with the second order is user-configurable.

9. The method of claim 8, wherein the price is determined based on a user-configurable formula.

10. The method of claim 5, wherein a quantity associated with the second order is distributed between prices within the indicator range.

11. The method of claim 5, wherein the first and second indicator ranges are user configurable.

12. The method of claim 5, wherein the first and second indicator range is movable in relation to the static axis of prices.

13. The method of claim 5, wherein automatically entering a second order for the tradable object to offset a position created with the first order comprises entering the second order to close the position created with the first order.

14. The method of claim 5, wherein the first order comprises an automatically entered order.

15. The method of claim 5, wherein the first order comprises a manually entered order.

16. A method for automatic scalping a tradable object in an electronic trading environment, the method comprising:

receiving a market data feed from an electronic exchange, the market data feed comprising an inside market with a best bid price and a best ask price currently available for the tradeable object;

displaying a bid display region and an ask display region in relation to a common static axis of prices, each region comprising a plurality of locations, wherein each location corresponds to a price level along the common static axis of prices, wherein the bid display region comprises a first indicator displayed in a location corresponding to the best bid price currently available for the tradeable object, and wherein the ask display region comprises a second indicator displayed in a location corresponding to the best ask price currently available for the tradeable object;

displaying along the common static axis of prices a target price indicator associated with a target price based on which an order is to be automatically entered for the tradable object;

detecting at a computer device a series of downward price decreases based on best bid prices and best ask prices being received from the electronic exchange in the market data feed;

in the series of the downward price decreases, responsive to detecting a time when the inside market crosses the target price associated with the target price indicator, automatically entering a first order to buy when the inside market crosses the target price associated with the target price indicator;

determining at a computer device that at least a portion of a quantity associated with the first order to buy has been filled;

detecting at a computer device a series of upward price increases based on best bid prices and best ask prices being received from the electronic exchange in the market data feed; and in the series of the upward price increases, responsive to detecting a time when the inside market crosses the target price associated with the target price indicator, automatically entering a second order to sell when the inside market crosses the target price associated with the target price indicator to offset a position created with the first order to buy, wherein a quantity of the second order to sell is set equal to the quantity of the first order to buy that was filled.

17. A computer readable medium having stored therein instructions to execute a method for automatic scalping a tradable object in an electronic trading environment, the method comprising:
- receiving a market data feed from an electronic exchange, the market data feed comprising an inside market with a best bid price and a best ask price currently available for the tradeable object;
- displaying a bid display region and an ask display region in relation to a common static axis of prices, each region comprising a plurality of locations, wherein each location corresponds to a price level along the common static axis of prices, wherein the bid display region comprises a first indicator displayed in a location corresponding to the best bid price currently available for the tradeable object, and wherein the ask display region comprises a second indicator displayed in a location corresponding to the best ask price currently available for the tradeable object;
- displaying along the common static axis of prices a target price indicator associated with a target price based on which an order is to be automatically entered for the tradable object;
- detecting at a computer device a series of downward price decreases based on best bid prices and best ask prices being received from the electronic exchange in the market data feed;
- in the series of the downward price decreases, responsive to detecting a time when the inside market crosses the target price associated with the target price indicator, automatically entering a first order to buy when the inside market crosses the target price associated with the target price indicator;
- determining at a computer device that at least a portion of a quantity associated with the first order to buy has been filled;
- detecting at a computer device a series of upward price increases based on best bid prices and best ask prices being received from the electronic exchange in the market data feed; and
- in the series of the upward price increases, responsive to detecting a time when the inside market crosses the target price associated with the target price indicator, automatically entering a second order to sell when the inside market crosses the target price associated with the target price indicator to offset a position created with the first order to buy, wherein a quantity of the second order to sell is set equal to the quantity of the first order to buy that was filled.

18. The method of claim 16, wherein the inside market crosses the target price in the series of upward price increase when a position of the inside market is above the target price.

19. The method of claim 18, wherein the inside market crosses the target price in the series of downward price decreases when a position of the inside market is below the target price.

20. The method of claim 16, wherein the first order to buy comprises a first market order and the second order to sell comprises a second market order.

21. The method of claim 1, wherein the first order to buy is placed at a price that is a predetermined number of ticks away from the inside market, and wherein the second order to sell is placed at a price that is a predetermined number of ticks away from the inside market.

22. The method of claim 1, wherein the first order to sell comprises a first market order and the second order to buy comprises a second market order.

23. The method of claim 1, wherein the first order to sell is placed at a price that is a predetermined number of ticks away from the inside market, and wherein the second order to buy is placed at a price that is a predetermined number of ticks away from the inside market.

24. The method of claim 5, wherein the first order to buy comprises a first market order and the second order to sell comprises a second market order.

25. The method of claim 1, wherein the first order to buy is placed at a price that is a predetermined number of ticks away from the inside market within the first indicator range, and wherein the second order to sell is placed at a price that is a predetermined number of ticks away from the inside market within the second indicator range.

* * * * *